United States Patent
Kawamura et al.

(10) Patent No.: US 6,881,690 B2
(45) Date of Patent: Apr. 19, 2005

(54) COMPOSITIONS FOR THE DECORATION OF CERAMIC MATERIALS

(75) Inventors: Takuya Kawamura, Nagoya (JP); Hiromichi Hayashi, Nagoya (JP); Nobuhiro Inoko, Nagoya (JP)

(73) Assignee: Noritake Co., Ltd., Nagoya (JP)

( * ) Notice: Subject to any disclaimer, the term of this patent is extended or adjusted under 35 U.S.C. 154(b) by 163 days.

(21) Appl. No.: 10/367,845

(22) Filed: Feb. 19, 2003

(65) Prior Publication Data

US 2003/0162646 A1 Aug. 28, 2003

(30) Foreign Application Priority Data

Feb. 19, 2002 (JP) ........................................ 2002-042311

(51) Int. Cl.$^7$ .......................... C03C 3/093; C03C 3/085; C03C 3/087; C03C 8/22
(52) U.S. Cl. .............................. 501/16; 501/17; 501/21; 501/26; 501/66; 501/67; 501/69; 501/70
(58) Field of Search .............................. 501/16, 17, 21, 501/26, 66, 67, 69, 70

(56) References Cited

U.S. PATENT DOCUMENTS

2002/0022133 A1    2/2002  Hayashi et al.

2004/0029700 A1 *  2/2004  Kato et al. ..................... 501/16

FOREIGN PATENT DOCUMENTS

| EP | 1 083 155 A1 | 3/2001 | |
|---|---|---|---|
| JP | 03279237 A * | 12/1991 | ............ C03C/8/18 |
| JP | A 6-56558 | 3/1994 | |
| JP | A 7-267677 | 10/1995 | |
| JP | 08041655 A * | 2/1996 | ............ C23D/5/00 |
| JP | A 8-133816 | 5/1996 | |
| JP | A 8-259258 | 10/1996 | |
| JP | A 10-167756 | 6/1998 | |

* cited by examiner

Primary Examiner—David Sample
(74) Attorney, Agent, or Firm—Oliff & Berridge, PLC

(57) ABSTRACT

New decorating materials suitable for the decoration of ceramic materials comprise a lead-free glass flux and at least one pigment. The glass flux comprises two lead-free glass compositions. One of the two glass compositions comprises, in weight percent, $SiO_2$: 45 to 60%, $Al_2O_3$: 5 to 20%, $B_2O_3$: 15 to 30%, and one or more alkali metal oxides: 5 to 10%, provided that $Li_2O$ is contained in an amount of 2% or more, with the proviso that the total amount of said oxides is 90% or more of the total weight of the composition. The other of the two glass compositions comprises, in weight percent, $SiO_2$: 60 to 75%, $Al_2O_3$: 5 to 20%, at least one of MgO, CaO, ZnO: 5 to 20% in total, and one or more alkali metal oxides: 0.5 to 5%, provided that $Li_2O$ is contained in an amount of 0.5% or more, with the proviso that the total amount of said oxides is 90% or more of the total weight of the composition.

15 Claims, No Drawings

COMPOSITIONS FOR THE DECORATION OF CERAMIC MATERIALS

This application claims priority to Japanese Patent Application No. 2002-042311, filed Feb. 19, 2002, the contents of which are incorporated herein by reference.

BACKGROUND OF THE INVENTION

1. Field of the Invention

The present invention relates to substantially lead-free glass flux compositions used for the decoration of ceramic materials and methods for making the same. The present invention also relates to materials for decorating ceramic materials which contain said glass flux compositions and methods for making the same.

2. Description of the Related Art

Generally, a material for decorating a ceramic material is composed of one or more pigments and a glass flux. For example, Japanese Laid-Open Patent Publication No. 6-56558 describes a decorating material for decorating the surface of a ceramic material with a noble metal. As a glass flux for use in a decorating material, it is preferable to use a glass flux mainly composed of $SiO_2$ (typically, a glass flux having a $SiO_2$ content of 45 wt % or more) in order to achieve clear development and luster for a decoration (hereinafter also referred to as "painting") formed by the decoration and to improve the water resistance and chemical resistance of the painting.

In so-called overglaze (on-glaze) decoration, a decorating material (paint), including various pigments (coloring components), is applied to a glazed surface that has been previously formed on the surface of a ceramic material (e.g., a glaze layer that is formed on porcelain with a hard glaze), and is then fired at a relatively low temperature of about 750 to 900° C. Accordingly, the glass flux contained in such a decorating material for overglaze (on-glaze) decoration is required to have a lower melting temperature and a lower softening point, which is the index of a melting temperature, than those of a glass flux contained in a decorating material for in-glaze decoration, which is normally fired at 1000 to 1300° C. On the other hand, the softening point of a glass composition generally tends to increase with an increase in its $SiO_2$ content. For this reason, it is preferable that glass flux contained in a decorating material for overglaze decoration has a low softening point suitable for overglaze decoration, while maintaining the $SiO_2$ content at a relatively high level.

In order to satisfy the above-described requirements, glass compositions (lead-containing glasses), which contain lead (Pb) as a component for lowering the softening point, have conventionally been used as the glass flux for a decorating material for overglaze decoration. For example, Japanese Laid-Open Patent Publication No. 7-267677 discloses a lead-containing glass flux for use in a decorating material. Presently, lead-free glass compositions, which contain components other than lead that have the function of lowering a softening point, have begun to be used as the glass flux for overglaze decoration. For example, Japanese Patent No. 2991370 (Japanese Laid-Open Patent Publication No. 8-259258) discloses decorating materials for overglaze decoration that contain a lead-free glass composition which is based within the $Li_2O$—$Al_2O_3$—$SiO_2$ system. For example the lead-free glass composition just described contains, in place of lead, $Li_2O$ or other alkali metal oxides as components for promoting melting (i.e., components for lowering the softening point).

However, sufficient consideration has not been given to the conventional lead-free glass fluxes for use in a decorating material, with respect to the thermal expansion. That is, if the coefficient of thermal expansion of the glass flux in a decorating material is too much higher than those of the body and glazed surface of a ceramic material, the difference in their thermal expansion may cause such problems as the peeling of a painting and excessive crazing, when firing the decorating material applied on the glazed surface of the ceramic material at a predetermined temperature. For this reason, it is preferable that the coefficient of thermal expansion of the glass flux is approximately that of the body and glaze of a ceramic material.

However, the conventional lead-free glass compositions used as the glass flux for a decorating material for overglaze decoration (e.g., a lead-free glass composition with a high $SiO_2$ content that contains an alkali metal oxide as a component for promoting melting) have such an undesirable tendency in that the coefficient of thermal expansion increases with a decreasing softening point (melting temperature). Accordingly, it has been necessary to set the $SiO_2$ content of these compositions to be lower than those of the lead-containing glass composition flux in order to achieve both a low softening point (low melting temperature) and a low coefficient of thermal expansion. Therefore, in order to realize a high quality decoration, typically an overglaze decoration, having a high luster, there has been a demand for the creation of a lead-free glass flux for use in a decorating material that has both a low softening point (low melting temperature) and a low coefficient of thermal expansion, while maintaining the $SiO_2$ content at a higher level than the conventional decorations.

SUMMARY OF THE INVENTION

It is, accordingly, one object of the present invention to provide a lead-free and high $SiO_2$ content glass flux having both a low softening point and a low coefficient of thermal expansion. Further, it is another object of the present invention to provide decorating materials (paints) containing such a glass flux and a method for making the same.

The present invention provides a lead-free glass flux composition which is based within the $Li_2O$—$Al_2O_3$—$SiO_2$ system (i.e., a lead-free glass composition containing $Li_2O$, $Al_2O_3$ and $SiO_2$ as essential components), which is a glass mixture in which a glass composition has a relatively high coefficient of thermal expansion and a relatively low softening point, and which is a glass composition that has a relatively low coefficient of thermal expansion and a relatively high softening point, all of which are mixed in an appropriate ratio.

Preferably, a lead-free glass flux is a combination (physical mixture) of the following two lead-free glass compositions.

One of the two glass compositions, which is essentially free from lead, comprises, in weight percent, $SiO_2$: 45 to 60%, $Al_2O_3$: 5 to 20%, $B_2O_3$: 15 to 30%, and one or more alkali metal oxides: 5 to 10%, provided that $Li_2O$ is contained in an amount of 2% or more, with the proviso that the total amount of said oxides is 90% or more of the total weight of the composition.

The other of the two glass compositions, which is essentially free from lead, comprises, in weight percent, $SiO_2$: 60 to 75%, $Al_2O_3$: 5 to 20%, at least one of MgO, CaO, ZnO; 5 to 20% in total, and one or more alkali metal oxides: 0.5 to 5%, provided that $Li_2O$ is contained in an amount of 0.5% or more, with the proviso that the total amount of said oxides is 90% or more of the total weight of the composition. Preferably, the coefficient of thermal expansion of a glass molded product formed from said glass flux (i.e. a glass body that has solidified after melting of said flux) is $5.5 \times 10^{-6} K^{-1}$ or less.

According to the glass flux taught herein, the above-mentioned two lead-free glass compositions of the $Li_2O—Al_2O_3—SiO_2$ system, that is, (a) a lead-free glass composition having a relatively high coefficient of thermal expansion and a relatively low softening point (hereinafter, also referred to as "high expansion/low softening glass composition" or "A") and (b) a lead-free glass composition having a relatively low coefficient of thermal expansion and a relatively high softening point (hereinafter, also referred to as "low expansion/high softening glass composition" or "B") are mixed at a mixing ratio at which the coefficient of thermal expansion of a glass molded product formed from the above-mentioned flux (ie., a glass molded product formed by melting and mixing the two glass compositions) is $5.5 \times 10^{-6} K^{-1}$ or less. As a result, a glass layer with a high $SiO_2$ content in which both a low thermal expansion and a low softening point are achieved can be formed on a glazed layer of a ceramic material. Accordingly, the pulse of a glass flux of the present invention as a glass component of a decorating material makes it possible to form a painting that has no peeling or crazing on a glazed surface of a ceramic material (e.g., on a hard glazed, porcelain surface) by overglaze decoration.

Preferably, the coefficient of thermal expansion of the lead-free glass composition A (high expansion/low softening glass composition) is in the range of $5.0 \times 10^{-6} K^{-1}$ to $7.0 \times 10^{-6} K^{-1}$ and the coefficient of thermal expansion of the lead-free glass composition B (low expansion/high softening glass composition) is in the range of $3.0 \times 10^{-6} K^{-1}$ to $5.0 \times 10^{-6} K^{-1}$. A glass flux suitable for overglaze decoration that is excellent, particularly in low thermal expansion properties (typically, the coefficient of thermal expansion is $5.0 \times 10^{-6} K^{-1}$ or less), and has a low softening point can be provided by mixing glass compositions A and B, each having a coefficient of thermal expansion in the above range.

More preferably, the softening point of the lead-free glass composition A (high expansion/low softening glass composition) is in the range of 500 to 600° C., and the softening point of the lead-free glass composition B (low expansion/high softening glass composition) is in the range of 700 to 800° C. A glass flux suitable for overglaze decoration that is excellent particularly in melting properties at low temperatures and has a low thermal expansion, can be provided by mixing glass compositions A and B, each of which has a softening point in the above range.

Preferably, the mixing ratio of glass composition A (high expansion/low softening glass composition) and glass composition B (low expansion/high softening glass composition), on a weight basis, is 10 to 40 parts of B to 60 to 90 parts of A (provided that the total of A and B is 100 parts). Such a mixing ratio can readily achieve a low thermal expansion and a low softening point (melting properties at low temperatures) that are desirable for overglaze decoration.

In a preferable lead-free glass flux, glass composition A and glass composition B that are mixed, are each prepared in powdered form. Such a glass flux in the form of powder is easy to use as a glass flux component of a decorating material.

Furthermore, the present invention provides a composition (decorating material) suitable for decoration on a glazed surface of a ceramic material, comprising at least one of the lead-free glass fluxes taught herein and at least one pigment (colorant). Typically, the coefficient of thermal expansion of the above-mentioned composition is $5.5 \times 10^{-6} K^{-1}$ or less (preferably $2.0 \times 10^{-6} K^{-1}$ to $5.0 \times 10^{-6} K^{-1}$). This composition contains the above-described glass flux, so that it can form a high quality painting on a glazed surface of a ceramic material (e.g., on a hard glaze of a porcelain) by overglaze decoration, and prevents peeling or crazing from occurring.

A preferable composition (decorating material) may comprise a low expansion ceramic raw material in a content of 20 wt % or less. The addition of a low expansion ceramic raw material, which is used as a thermal expansion modifier, makes it possible to adjust the coefficient of thermal expansion, without changing the composition of a flux component (e.g., the mixing ratio of the two glass compositions A and B or their $SiO_2$ contents).

Preferably, the low expansion ceramic raw material (thermal expansion modifier) may contain Li, Al, Si and O as the constituent elements. In one representative embodiment, the low expansion ceramic raw material may contain at least one selected from the group consisting of eucryptite, spodumene and petalite. A low expansion ceramic raw material containing Li, Al, Si and O as the constituent elements can promote the reduction of the coefficient of thermal expansion of a painting (glass layer) formed on a glazed surface of a ceramic material (particularly on a hard glaze of porcelain), together with $Li_2O$ contained in a glass flux.

One of the preferred compositions for use in decoration (decorating material) may contain zircon and/or a zircon-based pigment. More preferably, the composition may be substantially composed of: 50 to 75 wt % of the lead-free glass flux taught herein; 1 to 20 wt % of the above-mentioned low expansion ceramic raw material; and 15 to 40 wt % of zircon and/or zircon-based pigment, taking the whole composition as 100 wt %. A composition (decorating material) having such a constitution has a superior ability to prevent crazing or peeling, so that it can form a high quality painting on a glazed surface of a ceramic material.

Furthermore, the present invention provides a method for making a composition suitable for the decoration on a glazed surface of a ceramic material. This method separately prepares: A, a glass composition which is essentially free from lead and which comprises $Li_2O$, $B_2O_3$, $Al_2O_3$ and $SiO_2$ as essential ingredients, and the coefficient of thermal expansion of said composition is in the range of $5.0 \times 10^{-6} K^{-1}$ to $7.0 \times 10^{-6} K^{-1}$; B, a glass composition which is essentially free from lead and which comprises $Li_2O$, $Al_2O_3$, at least one of MgO, CaO, ZnO and $SiO_2$ as essential ingredients, and the coefficient of thermal expansion of said composition is in the range of $3.0 \times 10^{-6} K^{-1}$ to $5.0 \times 10^{-6} K^{-1}$; and at least one pigment, "C". Then, the prepared glass composition A, glass composition B and pigment C are mixed such that a composition (decorating material) having a coefficient of thermal expansion of $5.5 \times 10^{-6} K^{-1}$, or less, is obtained as a final product. Preferably, tile softening point of glass composition A is 500 to 600° C. and the softening point of glass composition B is 700 to 800° C.

The method of the present invention can provide a composition (decorating material) containing a lead-free glass flux composition, which is based within the $Li_2O—A_2O_3—SiO_2$ system (the core glass system), and has both the above-described low softening point (low melting temperature) and low coefficient of thermal expansion

DETAILED DESCRIPTION OF THE INVENTION

Hereinafter, preferred embodiments of the present invention will be described. It should be noted that the percentage representation (%) in the following description refers to % by weight.

In this specification, "thermal expansion coefficient" and "softening point" of glass compositions, glass fluxes and decorating materials refer to values calculated as follows. That is, a softening point (similar to a yield point) is a value obtained by performing a differential thermal analysis (DTA) on a glass sample to be measured (typically, a temperature corresponding to the second endothermic peak appearing when performing a differential thermal analysis). The softening point can be measured in accordance with the Fibre Elongation Method prescribed in JIS-R3104 and ASTM-C338. Further, the thermal expansion coefficient is an average coefficient of thermal expansion calculated by compression molding a glass composition, glass flux or decorating material that is to be measured, firing it at a temperature approximately 300° C. higher than the softening point for 100 minutes to produce a rod-shaped glass molded material with dimensions of 20 mm length×5 mm diameter and measuring the difference in the thermal expansion of the rod-shaped glass molded material from room temperature to 900° C. by a TMA analyzer (differential thermal expansion meter).

As described above, the glass flux as taught herein is a lead-free glass composition which is based within the $Li_2O$—$Al_2O_3$—$SiO_2$ system. It is a flux (melting agent) used as a glass component for use in a decorating material prepared by mixing a high expansion/low softening glass composition (the above-mentioned glass composition A) and a low expansion/high softening glass composition (the above-mentioned lead-free glass composition B), which are different from one another in the types of contained components (oxides) and their contents.

The high expansion/low softening glass composition, which is one of the constituting elements of the glass flux of the present invention, comprises $SiO_2$, $A_2O_3$ and $Li_2O$ as essential components. $SiO_2$ is the main component that constitutes the backbone of a glass layer (painting) formed on a glazed surface of a ceramic material. In this regard, it is desirable that the silica content be high. However, when the $SiO_2$ content is too high, the melting temperature (softening point) becomes too high, so that the high expansion/low softening glass composition cannot serve its desired function. On the, other hand, when the $SiO_2$ content is too low, a good glass layer cannot be formed, impairing excellent color development of any pigments. In addition, the water resistance, chemical resistance or the like, may be reduced The $SiO_2$ content is preferably 45 to 60% of the total weight of the high expansion/low softening glass composition and more preferably, about 50 to 60%.

$Al_2O_3$ is a component that controls the fluidity of a glass melt and is involved in the adhesion stability of the melt on the glazed surface. The $Al_2O_3$ content is preferably 5 to 20% of the total weight of the high expansion/low softening glass composition and more preferably, about 7 to 15%. When the $Al_2O_3$ content is too low, the adhesion stability of the melt may be decreased, impeding the formation of a glass layer with uniform thickness on the glazed surface. On the other hand, when the $Al_2O_3$ content is too high, the chemical resistance of the glass layer may be reduced, so that such a content is not preferable.

$Li_2O$ is one kind of alkali metal oxide and a component that is particularly capable of lowering a softening point and a melting temperature. It also has the ability to improve the chemical resistance (particularly, acid resistance), as well as promote the clear color, development of a painting (pigment). Furthermore, it can form a low expansive crystal in a glass layer by firing. $Li_2O$ can be partly replaced by other alkali metal oxides, typically $Na_2O$ and $K_2O$.

The content of the alkali metal oxides is preferably 5 to 10% of the total weight of the high expansion/low softening glass composition, and more preferably about 5 to 8%. The $Li_2O$ content is preferably 2% or more, and more preferably 4% or more, Accordingly, a preferable range of the content of alkali metal oxides (e.g., $Na_2O$, $K_2O$, etc.), other than $Li_2O$, is the difference obtained by subtracting the $Li_2O$ content from the above-mentioned preferable range of the content of the alkali metal oxides. When the content of the alkali metal oxides including $Li_2O$ is too much lower than the above-described numerical range, the effect of lowering a softening point and a melting temperature cannot be achieved On the other hand, when the above-mentioned content is too high, the coefficient of thermal expansion becomes too high even for the high expansion/low softening glass composition, so that such a content is not preferable.

It is preferable that the high expansion/low softening glass composition comprises $B_2O_3$ as the main component, in addition to the above-mentioned essential components. $B_2O_3$ is a component that has a high effect of lowering a softening point and a melting temperature. It is also a component that is capable of improving the transmittance of a glass layer formed on a glazed layer, while increasing luster. The $B_2O_3$ content is preferably 15 to 35% and more preferably about 20 to 30%. When the $B_2O_3$ content is too low, the effect of lowering a softening point and a melting temperature cannot be achieved. On the other hand, when the $B_2O_3$ content is too high, the water resistance of a glass layer (painting) may be decreased, so that such a content is not preferable.

Although the high expansion/low softening glass composition may be composed only of the above-mentioned $SiO_2$, $Al_2O_3$, $B_2O_3$ and alkali metal oxides, it may contain in addition to these main components, various secondary components (the total secondary components are preferably not more than 10% of the total weight of the high expansion/low softening glass composition) as long as it does not run counter to the objects of the present invention. Preferable examples of such secondary components include $ZrO_2$, $ZrO_2$ is a component that is capable of improving the chemical resistance (particularly, alkali resistance). As described above, it is preferable that the high expansion/low softening glass composition containing alkali metal oxides such as $Li_2O$ in a relatively high content contains $ZrO_2$ in a content of approximately 2 to 10% (particularly, 4 to 6%). However, when the $ZrO_2$ is too high, the softening point significantly increases, so that such a content is not preferable.

The low expansion/high softening glass composition, which is the other component of the glass flux of the present invention, comprises $SiO_2$, $Al_2O_3$ and $Li_2O$ as essential components, as with the above mentioned high expansion/ low softening glass composition. The effects achieved by these components are the same as described above, and redundant descriptions are omitted. The $SiO_2$ content of the low expansion/high softening glass composition can be set higher than that of the high expansion/low softening glass composition. A preferable $SiO_2$ content is 60 to 75% of the total weight of the low expansion/high softening glass composition, and more preferably 65 to 70%. When the $SiO_2$ content is too much lower than this range, the low expansion/high softening glass composition cannot serve its purpose. On the other hand, when the $SiO_2$ content is too much higher than this range, the softening point and the melting temperature become too high even for the low expansion/high softening glass composition, so that such a content is not preferable.

The $Al_2O_3$ content of the low expansion/high softening glass composition is preferably 5 to 20% of the total weight of the low expansion/high softening glass composition, and more preferably about 7 to 15%, as with the high expansion/low softening glass composition. Additionally, the content of the alkali metal oxides including $Li_2O$ can be set lower than that of the high expansion/low softening glass composition. The content of the alkali metal oxides is preferably 0.5 to 5% of the total weight of the low expansion/high softening glass composition and more preferably about 2 to 4%. However, the $Li_2O$ content is preferably 0.5% or more, and more preferably 1% or more. When the content of the alkali metal oxides including $Li_2O$ is too much higher than the above-mentioned numerical range, the coefficient of thermal expansion becomes too high, so that such a content is not preferable.

The low expansion/high softening glass composition comprises, in addition to the above-mentioned main components, at least one metal oxide selected from MgO, CaO and ZnO. MgO, CaO and ZnO are components that are capable of adjusting a thermal expansion coefficient. In addition to such an adjusting function, ZnO also contributes to the enhancement of color development and increases the luster of a painting after firing, as well as to the improvement of the melt adhesion of a glass layer (painting) to the glazed surface and the body. Additionally, CaO is a component that is capable of increasing the hardness of the glass layer (painting), thereby improving the abrasion resistance, and MgO is a component that is capable of also modifying the viscosity when melting the glass. Typically, at least one of these oxides is contained in a content of 5 to 20% of the total weight of the low expansion/bigh softening glass composition, and the content is preferably about 7 20%. For example, the ZnO content is preferably 5 to 10%, and each of the CaO and MgO contents is preferably 1 to 5%.

It should be noted that the above-described compositions are preferred examples of the high expansion/low softening glass composition and the low expansion/high softening glass composition that can be used for preparation of the glass fluxes as taught herein, and the present invention is not limited thereto. For example, the low expansion/high softening glass composition may contain $B_2O_3$ in a suitable amount (e.g., the $B_2O_3$ content is 1 to 2%) as a secondary component, and the high expansion/low softening glass composition may contain a suitable amount of MgO, CaO and/or ZnO (e.g., the MgO content is 1 to 2%) as a secondary component, so long as the objects of the present invention can be achieved. Further, in addition to the above-mentioned oxides, $P_2O_5$, BaO, $Bi_2O_3$, $La_2O_3$, $TiO_2$, $SnO_2$ or the like, may be contained in a suitable amount such that the content thereof is 10% or less (preferably 5% or less) of the total weight of the glass composition, for various purposes (e.g., improving the stability and adjusting the transparency (transmittance) of the glass layer).

The coefficient of thermal expansion of the high expansion/low softening glass composition, which is mixed with the glass flux for use in a decorating material for applying an overglaze decoration or the like on a glazed surface of a ceramic material (e.g., a hard glaze surface of a porcelain), is preferably $5.0 \times 10^{-6} K^{-1}$ or more, to less than $7.0 \times 10^{-6} K^{-1}$ (particularly $5.0 \times 10^{-6} K^{-1}$ or more, to less than $6.0 \times 10^{-6} K^{-1}$). Further, the softening point thereof is preferably in the range of 500 to 600° C. Accordingly, the content of each of the above-mentioned main components and secondary components may be determined such that the high expansion/low softening glass composition exhibits such a thermal expansion coefficient and/or softening point.

On the other hand, the coefficient of thermal expansion of the low expansion/high softening glass composition, which is combined with the high expansion/low softening glass composition exhibiting such thermal expansion coefficient and/or softening point, is preferably $3.0 \times 10^{-6} K^{-1}$ or more, to less than $5.0 \times 10^{-6} K^{-1}$, particularly $3.0 \times 10^{-6} K^{-1}$ or more, to less than $4.0 \times 10^{-6} K^{-1}$. Further, the softening point is preferably in the range 700 to 800° C. Accordingly, the content of each of the oxides serving as the above-mentioned main components or secondary components, may be determined such that the low expansion/high softening glass composition exhibits such a thermal expansion coefficient and/or softening point.

There is no particular limitation with respect to the methods of making the high expansion/low softening glass composition and the low expansion/high softening glass composition. Methods similar to those used for making conventional glass compositions can be used. Typically, compounds that can provide the various oxide components constituting the above-mentioned compositions (e.g., industrial products, reagents or various mineral materials that contain oxides, carbonates, nitrates, composite oxides containing the above components) and, as necessary, other additives are charged into a mixer such as a wet or dry ball mill at a predetermined mixing ratio, and mixed for several hours to several tens of hours. After being dried, the obtained mixture is, placed in a fire resistant crucible, and heated and melted at a suitably high temperature, typically 1000° C. to 1500° C. Then, this molten product is rapidly cooled (preferably introduced in water) into glass. The obtained vitreous composition can be formed into desired forms by various methods. For example, a powdered glass composition having a desired average particle size of 0.1 $\mu$m to 10 $\mu$m can be formed by pulverizing it with a ball mill or suitably sieving it.

Then, a desired glass flux can be prepared by mixing the high expansion/low softening glass composition and the low expansion/high softening glass composition obtained as above at a suitable mixing ratio. The glass flux for use in a decorating material is preferably prepared in powdered form. Such a powered glass flux (preferable average mean particle size; 1 $\mu$m to 10 $\mu$m) can be obtained by mixing the powdered high expansion/low softening glass composition and low expansion/high softening glass composition. For example, a glass flux in which these glass compositions are uniformly mixed can be prepared by mixing and stirring these two powered glass compositions by commonly used mixing and stirring means (e.g., various mixers and pulverizers).

In the preparation of the glass flux, the mixing ratio of the above two glass compositions may be suitably adjusted such that the coefficient of thermal expansion of a glass layer (glass product) formed from the above flux is $5.5 \times 10^{-6} K^{-1}$ or less. In general, the coefficient of thermal expansions of the body and glaze (glaze layer) of a ceramic material are $5.5 \times 10^{-6} K^{-1}$ or less, typically $2.0 \times 10^{-6} K^{-1}$ to $5.0 \times 10^{-6} K^{-1}$. It is preferable that the coefficient of thermal expansions of these objects to be decorated, and those of a glass flux and a decorating material composed mainly of the glass flux are similar to one another. This makes it possible to more effectively prevent peeling or crazing of a glass layer (painting) that has been decorated and fired. In particular, it is preferable that a glass flux for use in a decorating material for applying an overglaze decoration on a glazed surface of porcelain or china, has a low softening point, preferably 600° C. or less. Furthermore, the coefficient of thermal expansion is preferably $5 \times 10^{-6} K^{-1}$ or less, and more preferably $4.0 \times 10^{-6} K^{-1}$ or less (e.g., $2.5 \times 10^{-6} K^{-1}$ to $4.0 \times 10^{-6} K^{-1}$). Such a glass flux having a low thermal expansion coefficient can be obtained, for example, by mixing a high expansion/low softening glass composition and low expansion/high softening glass composition, each having the above-mentioned preferable coefficient of thermal expansion and softening point and composed mainly of $SiO_2$, at the following mixing ratio: 10–40 parts of the low expansion/high softening glass composition to 60–90 parts of the high expansion/low softening glass composition on a weight basis (provided that the total of these compositions is 100 parts).

Next, a composition for use in a decorating material of the present invention will be described. A decorating material provided by the present invention comprises various pigments as main constituents, in addition to the above-mentioned glass flux. Examples of these pigments include various inorganic pigments (e.g., zircon, turquoise blue, maroon, vanadium-zirconium yellow, cobalt blue and titanium white). In particular, it is preferable to use zircon ($ZrSiO_4$) and/or a zircon-based pigment which refers to an inorganic pigment such as turquoise blue in which various metallic elements (V, Pr, Fe, Co, Ni and the like) form a solid solution in $ZrO_2/SiO_2$. Zircon and a zircon-based pigment generally have a low coefficient of thermal expansion, so that they can also serve as an adjusting material for lowering the thermal expansion coefficient of a decorating material.

In order to adjust the thermal expansion, various low expansion ceramic raw materials (ceramic thermal expansion modifiers) can be added to a decorating material. Examples of such ceramic raw materials include cordierite, β-eucryptite, β-spodumene and petalite. It is preferable to include at least one of eucryptite, spodumene and petalite, each containing Li, Al, Si and O as constituent elements. It is particularly preferable to add β-eucryptite.

A decorating material of the present invention is provided typically in powered form. Such a powdered decorating material can be made by mixing and stirring a glass flux and a pigment that are prepared in powdered form and, as necessary, the above-mentioned low expansion ceramic raw material and other additives (e.g., glycerin, turpentine oil, fatty oil, gelatin) at a mixing ratio at which the coefficient of thermal expansion of a glass obtained from the resulting product is preferably $5.5 \times 10^{-6} K^{-1}$ or less (more preferably $5.0 \times 10^{-6} K^{-1}$ or less, typically $2.0 \times 10^{-6} K^{-1}$ to $4.0 \times 10^{-6} K^{-1}$). For example, these powered raw materials are mixed and stirred so as to provide a mixture whose thermal expansion coefficient is $5.5 \times 10^{-6} K^{-1}$ or less, preferably $5.0 \times 10^{-6} K^{-1}$ or less, and typically $2.0 \times 10^{-6} K^{-1}$ to $4.0 \times 10^{-6} K^{-1}$ that comprises 50 to 75% of a powdered glass flux comprising a high expansion/low softening glass composition and a low expansion/high softening glass composition, each having coefficient of thermal expansion and softening point in the above-mentioned preferable numerical range of 15 to 40% of one or more inorganic pigments (preferably zircon and/or zircon-based pigment) and 1 to 20% of one or more of a low expansion ceramic raw material (eucryptite, spodumene, petalite, etc.).

Alternatively, the decorating material can be made by mixing separately prepared high expansion/low softening glass composition and low expansion/high softening glass composition with a pigment, a low expansion ceramic raw material (e.g. β-eucryptite) and the like, without previously mixing (i.e., without preparing a glass flux of the present invention beforehand). For example, a high expansion/low softening glass composition having a thermal expansion coefficient in the range of $5.0 \times 10^{-6} K^{-1}$ to $7.0 \times 10^{-6} K^{-1}$ (more preferably $5.0 \times 10^{-6} K^{-1}$ or more to less than $6.0 \times 10^{-6} K^{-1}$) may be mixed and stirred with a low expansion/high softening glass composition composed mainly of $SiO_2$ and having a thermal expansion coefficient in the range of $3.0 \times 10^{-6} K^{-1}$ to $5.0 \times 10^{-6} K^{-1}$ (more preferably $3.0 \times 10^{-6} K^{-1}$ or more to less than $4.0 \times 10^{-6} K^{-1}$), together with an inorganic pigment and other additives (a low expansion ceramic raw material, etc). In this case, a preferable mixing ratio by weight, taking the whole mixture as 100 parts, is 50 to 75 parts of the total amount of the high expansion/low softening glass composition and the low expansion/high softening glass composition, 15 to 40 parts of the inorganic decorating pigment (preferably zircon and/or zircon-based pigment) and 1 to 20 parts of the low expansion ceramic raw material (e.g., eucryptite, spodumene or petalite) (provided that the mixing ratio is determined such that the thermal expansion coefficient is $5.5 \times 10^{-6} K^{-1}$ or more, preferably $5.0 \times 10^{-6} K^{-1}$ or less and typically $2.0 \times 10^{-6} K^{-1}$ to $4.0 \times 10^{-6} K^{-1}$). A preferable mixing ratio of the high expansion/low softening glass composition and low expansion/high softening glass composition that are added at this time is 10 to 40 parts of the low expansion/high softening glass composition to 60 to 90 parts of the high expansion/low softening glass composition on a weight basis (provided that the total of these compositions is 100 parts). Such a mixing ratio provides a decorating material for which a low coefficient of thermal expansion (preferably $5.0 \times 10^{-6} K^{-1}$ or less and typically $2.0 \times 10^{-6} K^{-1}$ to $4.0 \times 10^{-6} K^{-1}$) and a low softening point (preferably 600° C. or less) are achieved, which is suitable for applying an overglaze decoration or the like on a glazed surface of a ceramic material (e.g., a hard glazed surface of a porcelain).

The present invention provides ceramic articles such as chinas and porcelains which have been decorated using a decorating material taught herein. A decorating material taught herein can be used in the same manner as conventional decorating materials. For example, it can be used for directly decorating a ceramic material by a paintbrush or the like. Alternatively, a decorating material taught herein can be used for a screen printing method. Ceramic materials suitable for decoration include various chinas (typically bone china), porcelains and earthenwares. The decorating material taught herein can be suitably used, particularly for applying a decoration on glazed surfaces of ceramic materials such as chinas and porcelains. Alternatively, in the case of using a transfer paper (decalcomania paper) for applying a decoration, the decorating material can also be used for forming a decorating layer of the transfer paper. Such a screen printing method and a method of using a transfer paper (decalcomania paper) can be performed according to conventional methods and are not the features that particularly characterize the present invention, so that detailed descriptions thereof are omitted.

Since a decorating material containing a glass flux of the present teaching has a low softening point, it can be suitably used in overglaze decoration applications, in which the firing temperature is about 750 to 900° C. Therefore, the present invention can provide a decorating material comprising a glass flux and at least one pigment, such as zircon as a main component (preferably farther containing a low expansion ceramic raw material such as β-eucryptite), which has a low melting point and a low coefficient of thermal expansion that are suitable for forming an opaque white painting or the like on a hard glazed layer of china and porcelain.

EXAMPLES

The present invention will be described more specifically by way of examples below, but the present invention is not limited thereto.

A decoration material (paint) for overglaze decoration (opaque white painting) on a hard glazed surface of a porcelain was prepared using, as raw materials, a high expansion/low softening glass composition and a low expansion/high softening glass composition, which were suitably selected and combined from the high expansion/low softening glass compositions (a-1 to a-3, a total of three kinds) shown in Table 1 and the low expansion/high softening glass compositions (b-1 to b-2, a total of two kinds) shown in Table 2, together with a powdered zircon (pigment) and a powdered β-eucryptite. More specifically, as shown in the columns of Examples 1 to 4 and Comparative Examples 1 to 2 in Table 3, a high expansion/low softening glass composition (a-1 to a-3 in Table 1) and a low expansion/high softening glass composition (b-1 to b-2 in Table 2) were selected for use. The glass compositions, zircon and β-eucryptile were charged in a ball mill such that each of the mixing ratios shown in the table was obtained, followed by mixing and stirring for 8 to 10 hours. Thus, several powdered decorating materials (a total of 6 kinds, Examples 1–4 and Comparative Examples 1–2) were made.

TABLE 1

| High expansion/low softening glass composition | a-1 | a-2 | a-3 |
|---|---|---|---|
| Thermal expansion coefficient ($K^{-1}$) | $5.5 \times 10^{-6}$ | $6.2 \times 10^{-6}$ | $8.8 \times 10^{-6}$ |
| Softening point (° C.) | 558 | 550 | 547 |
| Component (weight %) | | | |
| $SiO_2$ | 55.1 | 54.2 | 50.9 |
| $Al_2O_3$ | 8.2 | 7.3 | 6.7 |
| $Li_2O$ | 4.7 | 4.1 | 5.8 |
| $Na_2O$ | 1.9 | 4.0 | 6.5 |
| $K_2O$ | 1.5 | — | — |
| $B_2O_3$ | 24.3 | 25.6 | 15.9 |
| $ZrO_2$ | 4.3 | 2.9 | 5.9 |
| MgO | — | 0.7 | 1.6 |
| CaO | — | — | 2.7 |
| ZnO | — | 1.3 | 3.9 |

TABLE 2

| Low expansion/high softening glass composition | b-1 | b-2 |
|---|---|---|
| Thermal expansion coefficient ($K^{-1}$) | $3.8 \times 10^{-6}$ | $5.4 \times 10^{-6}$ |
| Softening point (° C.) | 740 | 580 |
| Component (% by weight) | | |
| $SiO_2$ | 68.1 | 61.2 |
| $Al_2O_3$ | 11.6 | 8.6 |
| $Li_2O$ | 1.4 | 3.2 |
| $Na_2O$ | — | 4.1 |
| $K_2O$ | 1.2 | 0.5 |
| $B_2O_3$ | 0.8 | 8.4 |
| $ZrO_2$ | — | 3.5 |
| MgO | 4.9 | 1.9 |
| CaO | 2.7 | 2.7 |
| ZnO | 9.1 | 6.0 |

TABLE 3

| Mixing ratio (% by weight) | Ex.1 | Ex2. | Ex.3 | Ex.4 | Com. Ex.1 | Com. Ex2 |
|---|---|---|---|---|---|---|
| High expansion/low softening glass composition | | | | | | |
| a-1 | 50 | 55 | 50 | | | |
| a-2 | | | | 50 | 50 | 50 |
| a-3 | | | | | 15 | |
| Low expansion/high softening glass composition | | | | | | |
| b-1 | 15 | 15 | 20 | 20 | | |
| b-2 | | | | | | 15 |
| Zircon (pigment) | 25 | 15 | 20 | 20 | 25 | 25 |
| β-eucryptite | 10 | 15 | 10 | 10 | 10 | 10 |

Table 4 shows the content of each component (in terms of oxide) and the coefficient of thermal expansion of the obtained decorating materials. As is clear from the listed numerical values, the coefficient of thermal expansion of each of the decorating materials of the examples was less than $5.0 \times 10^{-6} K^{-1}$ (more specifically, less than $4.0 \times 10^{-6} K^{-1}$). In particular, the decorating materials of Examples 1 to 3 had an expansion rate as low as $3.0 \times 10^{-6} K^{-1}$ or less. Therefore, the decorating materials of these examples are suitable for applying an overglaze decoration on a glaze of a ceramic article (typically, a hard glaze of a porcelain) that generally has a coefficient of thermal expansion of about $4 \times 10^{-6} K^{-1}$ to $6 \times 10^{-6} K^{-1}$. On the other hand, the decorating material of Comparative Example 1, which did not contain a low expansion/high softening glass composition (b-1 and b-2 in Table 2), had a thermal expansion coefficient as high as $5.8 \times 10^{-6} K^{-1}$ regardless of having the same composition as that of each of the examples, indicating that it was not suitable for applying an overglaze decoration on a glaze of a ceramic material (typically, a hard glaze of a porcelain).

TABLE 4

| | Ex.1 | Ex.2 | Ex.3 | Ex.4 | Com. Ex.1 | Com. Ex.2 |
|---|---|---|---|---|---|---|
| Component (% by weight) | | | | | | |
| $SiO_2$ | 49.42 | 50.57 | 51.19 | 50.60 | 46.22 | 47.78 |
| $Al_2O_3$ | 8.66 | 10.48 | 9.24 | 8.79 | 7.47 | 7.76 |
| $Li_2O$ | 6.44 | 8.60 | 6.51 | 6.18 | 6.77 | 6.37 |
| $Na_2O$ | 0.99 | 1.09 | 0.99 | 2.00 | 2.98 | 2.61 |
| $K_2O$ | 0.92 | 0.99 | 0.98 | 0.24 | — | 0.07 |
| $B_2O_3$ | 12.28 | 13.50 | 12.32 | 12.96 | 15.17 | 14.06 |
| $ZrO_2$ | 18.79 | 12.26 | 15.43 | 14.94 | 19.20 | 18.83 |
| MgO | 0.74 | 0.74 | 0.98 | 1.28 | 0.55 | 0.58 |
| CaO | 0.41 | 0.41 | 0.54 | 0.54 | 0.41 | 0.40 |
| ZnO | 1.37 | 1.37 | 1.82 | 2.47 | 1.24 | 1.55 |
| Thermal expansion coefficient ($\times 10^{-6} K^{-1}$) | 2.9 | 2.2 | 2.3 | 3.5 | 5.8 | 4.7 |

Next, a glass layer (an opaque white painting in this embodiment) was formed on a glazed surface of a porcelain by using each of the decorating materials of the examples and comparative examples. Then it was evaluated for the characteristics. More specifically, each of the glazes listed in Table 5 was applied on the surface of the body of a porcelain to form a glaze layer. A decoration (overglaze decoration) was applied on the glazed surface by using each of the decorating materials of Examples 1 to 4 and Comparative Example 1 to 2. Then, the porcelain applied with the decoration was fired at 880° C. to form an opaque white painting (glass layer) formed from each of the decorating materials.

TABLE 5

|  | Glaze |
| --- | --- |
| Component (% by weight) | |
| $SiO_2$ | 75.7 |
| $Al_2O_3$ | 12.5 |
| $Na_2O$ | 1.3 |
| $K_2O$ | 5.7 |
| MgO | 1.1 |
| CaO | 3.8 |
| Softening point (° C.) | 1250 |
| Thermal expansion coefficient ($\times 10^{-6}$ $K^{-1}$) | 4.3 |

Luster

Visual inspection showed that each of the obtained opaque white paintings (glass layers) exhibited good luster. In particular, the opaque white painting formed from the decorating material of Example 1 was superior in luster to each of those of the other examples and comparative examples, exhibiting a luster equal to or higher than those of the opaque white paintings formed from the conventional decorating materials comprising a lead-containing glass flux.

Alkali Resistance

Each of the opaque white paintings (glass layers) was immersed in a 0.5 M sodium carbonate solution (pH 11.0) at 100° C. for 2 hours and then evaluated for the alkali resistance. More specifically, after the immersion in the above-mentioned alkali solution, the surface of the white painting was wiped with fabric, and the presence or absence of color and luster was evaluated by visual inspection. As a result, the color and luster were highly maintained after the alkali treatment in the case of the white paintings formed form the decorating materials of the examples, as compared with the white painting formed from the decorating material of Comparative Example 1. In particular, the white painting formed from the decorating material of Example 1 was confirmed to have high alkali resistance.

Acid Resistance

Each of the opaque white paintings (glass layers) was immersed in a 4 M acetic acid solution (pH 2.5) at room temperature for 24 hours and then evaluated for the acid resistance. More specifically, after the immersion in the above-mentioned acetic acid solution, the surface of the white painting was wiped with fabric, and the change in color and luster before and after the immersion was evaluated by visual inspection. As a result, each of the white paintings formed from the decorating materials of the examples showed no change in color and luster, exhibiting good acid resistance.

Other Chemical Resistances

A cleaning solution having a concentration of 0.15% was prepared using a commercially available detergent (product name: "Deter-SHELL LK" (registered trade mark of Shell International Petroleum Co Ltd.)). Each of the white paintings (glass layers) was immersed in the clearing solution at 70° C. for 16 hours and then evaluated for the detergent resistance. Further, each of the white paintings (glass layers) was immersed in boiling water at 80° C. for 48 hours and then evaluated for the boiling water resistance. After the immersion, the surface of the white painting was wiped with fabric, and the change in color and luster before and after the immersion was evaluated by visual inspection in each of the detergent resistance test and the boiling water resistance test.

As a result, each of the white paintings formed from the decorating materials of the examples showed no change in color and luster, exhibiting good detergent resistance and boiling water resistance.

Hardness and Fracture Toughness Value

Each of the white paintings formed on a glazed surface of a porcelain was examined for the hardness based on the Vickers hardness scale. More specifically, a piece of 10 mm square (5 mm thick) was cut out from the porcelain formed with each of the white paintings, and the Vickers hardness was measured using a hardness tester ("AVK-C1" manufactured by Akashi Corporation) according to JIS B7725 under the following conditions; load; 5 kg, loading time; 15 seconds, measurement starting time; 1 minute after the completion of loading, and the number of measurement (n); 5. Further, the plane strain fracture toughness, $K_{1C}(Pa \cdot m^{1.2})$ was determined by the equation: $K_{1C}=(0.026 \times E^{1/2} \times P^{1/2} \times a)/C^{3/2}$ based on the indentation fracture method (IF method) according to JIS R1607. In the equation, E is Young's modulus (Pa), P is the indentation diagonal length (m), "a" is the load (N) and C is one-half of the average crack length (m). Table 6 shows the obtained hardness and the measured values of $K_{1C}$. Each of the white paintings formed from the decorating materials of the examples exhibited sufficient hardness and fracture toughness values.

TABLE 6

|  | Crazing condition (Good 1 >>> 5 Poor) | Vickers hardness | Fracture toughness value $K_{IC}$ (MPa · $m^{1/2}$) |
| --- | --- | --- | --- |
| Ex.1 | 1 | 397 | 2.06 |
| Ex.2 | 2 | 367 | 1.81 |
| Ex.3 | 2 | 326 | 1.71 |
| Ex.4 | 4 | 481 | 1.80 |
| Com.Ex.1 | 5 | 549 | 1.83 |
| Com.Ex.2 | 3 | 556 | 2.07 |

Degree of Crazing

Next, fluorescent paint was applied on the surface of each of the white paintings, and dried for 5 minutes. Thereafter, the fluorescent paint was wiped off, and the presence or absence of crazing on the surface of the white painting was confirmed under an ultraviolet lamp. More specifically, the presence or absence of crazing was determined by detecting the fluorescent paint infiltrated into the crazing on the surface of the white painting. The results are shown in the relevant column of Table 6. The numbers in the table are the relative evaluations obtained by visual inspection, and the larger numbers indicate a higher fluorescence, that is, the presence of more crazing. As is clear from this table, each of the white paintings formed from the decorating materials of the examples had less crazing as compared with the white painting formed from the decorating material of Comparative Example 1. In particular, no crazing was observed on the white painting formed from the decorating material of Example 1.

Specific examples of the present invention have been described above, but they are only illustrative and not limiting the scope of the claims. All changes and modifications from the specific examples illustrated above are intended to be embraced in the techniques disclosed in the appended claims. For example, in the formation of a glass flux of the present invention, two or more high expansion/low softening glass compositions having different compositions from each other may be mixed with two or more low expansion/high softening glass compositions having different compositions from each other. The technical elements described in the specification can exhibit technical usefulness, either alone or in combination, and combinations are not limited to those described in the claims as filed. The techniques illustrated in the specification can achieve a plurality of purposes at the same time, and achieving only one of them has technical usefulness.

What is claimed is:

1. A lead-free glass flux suitable for coating onto a glazed surface, comprising the following two glass compositions:

(a) a glass composition which is essentially free from lead and which comprises, in weight percent, $SiO_2$: 45 to 60%, $Al_2O_3$: 5 to 20%, $B_2O_3$: 15 to 30%, and one or more alkali metal oxides: 5 to 10%, provided that $Li_2O$ is contained in an amount of 2% or more, with the proviso that the total amount of said oxides is 90% or more of the total weight of the composition; and (b) a glass composition which is essentially free from lead and which comprises, in weight percent, $SiO_2$: 60 to 75%, $Al_2O_3$: 5 to 20%, at least one of MgO, CaO, ZnO: 5 to 20% in total and one or more alkali metal oxides: 0.5 to 5%, provided that $Li_2O$ is contained in an amount of 0.5% or more, with the proviso that the total amount of said oxides is 90% or more of the total weight of the composition;

wherein the glass compositions (a) and (b) are mixed such that the coefficient of thermal expansion of a glass molded product formed from the flux is $5.5 \times 10^{-6} K^{-1}$ or less.

2. The glass flux according to claim 1, wherein the coefficient of thermal expansion of the glass composition (a) is in the range of $5.0 \times 10^{-6} K^{-1}$ to $7.0 \times 10^{-6} K^{-1}$ and the coefficient of thermal expansion of the glass composition (b) is in the range of $3.0 \times 10^{-6} K^{-1}$ to $5.0 \times 10^{-6} K^{-1}$.

3. The glass flux according to claim 1, wherein the softening point of the glass composition (a) is in the range of 500 to 600° C. and the softening point of the glass composition (b) is in the range of 700 to 800° C.

4. The glass flux according to claim 1, wherein the mixing ratio of the glass composition (a) and the glass composition (b) on a weight basis is 10 to 40 parts of the glass composition (b) to 60 to 90 parts of the glass composition (a), provided that the total of (a) and (b) is 100 parts.

5. The glass flux according to claim 1, wherein the glass composition (a) and the glass composition (b) that are mixed are each prepared in powdered form.

6. A composition suitable for the decoration of ceramic materials, comprising:

a lead-free glass flux as claimed in claim 1 and at least one pigment.

7. The composition according to claim 6, further comprising at least one low expansion ceramic raw material in a content of 20% or less of the total weight of the composition.

8. The composition according to claim 7, wherein the low expansion ceramic raw material contains at least one selected from the group consisting of eucryptite, spodumene and petalite.

9. The composition according to claim 7, wherein the pigment is zircon and/or zircon-based pigment and wherein the composition is substantially composed of:

50 to 75 wt % of the lead-free glass flux;

1 to 20 wt % of the low expansion ceramic raw material; and 15 to 40 wt % of zircon and/or zircon-based pigment.

10. A method for making a composition suitable for the decoration of ceramic materials comprising the steps of:

separately preparing;

(a) a glass composition which is essentially free from lead and which comprises, in weight percent, $SiO_2$: 45 to 60%, $Al_2O_3$: 5 to 20 wt %, $B_2O_3$: 15 to 30 wt %, and one or more alkali metal oxides: 5 to 10%, provided that $Li_2O$ is contained in an amount of 2% or more, with the proviso that the total amount of said oxides is 90% or more of the composition, and the coefficient of thermal expansion of said composition is in the range of $5.0 \times 10^{-6} K_{-1}$ to $7.0 \times 10^{-6} K^{-1}$;

(b) a glass composition which is essentially free from lead and which comprises, in weight percent, $SiO_2$: 60 to 75%, $Al_2O_3$: 5 to 20 wt %, at least one of MgO, CaO, ZnO: 5 to 20% in total, and one or more alkali metal oxides: 0.5 to 5%, provided that $Li_2O$ is contained in an amount of 0.5% or more, with the proviso that the total amount of said oxides is 90% or more of the composition, and the coefficient of thermal expansion of said composition is in the range of $3.0 \times 10^{-6} K^{-1}$ to $5.0 \times 10^{-6} K^{-1}$;

(c) at least one pigment mixing the prepared glass composition (a), glass composition (b), and pigment (c) such that a decorating material having a coefficient of thermal expansion of $5.5 \times 10^{-6} K^{-1}$ or less is obtained.

11. The method according to claim 10, wherein the softening point of the glass composition (a) is in the range of 500 to 600° C. and the softening point of the glass composition (b) is in the range of 700 to 800° C.

12. The method according to claim 10, wherein at least one low expansion ceramic raw material (d) is further mixed in the mixing step.

13. The method according to claim 12, wherein the low-expansion ceramic raw material contains at least one selected from the group consisting of eucryptite, spodumene and petalite.

14. The method according to claim 12, wherein zircon and/or zircon-based pigment is used as the pigment (c) and wherein the mixing step is performed so as to provide a mixture that is substantially composed of the following composition:

50 to 75 wt % of the total amount of the glass composition (a) and the glass composition (b);

15 to 40 wt % of the pigment (c); and 1 to 20 wt % of a low expansion ceramic raw material (d), provided that the total of (a), (b), (c) and (d) is 100 wt %, wherein the mixing ratio of the glass composition (a) and the glass composition (b) on a weight basis is 10 to 40 parts of the glass composition (b) to 60 to 90 parts of the glass composition (a), provided that the total of (a) and (b) is 100 parts.

15. A ceramic article which has been decorated using a composition as claimed in claim 6.

* * * * *